United States Patent
VanHarlingen et al.

(10) Patent No.: US 7,979,027 B2
(45) Date of Patent: Jul. 12, 2011

(54) METHOD AND SYSTEM FOR SELECTING, TRANSMITTING, AND RECEIVING AN UNUSED CARRIER FREQUENCY AND TRANSMITTING OVER THE UNUSED CARRIER FREQUENCY

(75) Inventors: Brian VanHarlingen, Torrance, CA (US); Christopher L. McGugan, Redondo, CA (US)

(73) Assignee: Belkin International, Inc., Playa Vista, CA (US)

( * ) Notice: Subject to any disclaimer, the term of this patent is extended or adjusted under 35 U.S.C. 154(b) by 682 days.

(21) Appl. No.: 12/039,620

(22) Filed: Feb. 28, 2008

(65) Prior Publication Data

US 2009/0221244 A1    Sep. 3, 2009

(51) Int. Cl.
H04B 7/00    (2006.01)
H04B 17/00   (2006.01)

(52) U.S. Cl. ............... 455/41.2; 455/67.11; 455/345

(58) Field of Classification Search .......... 455/41.2, 455/67.11, 150.1, 161.1, 63.1, 66.1, 556.1, 455/99, 344, 345
See application file for complete search history.

(56) References Cited

U.S. PATENT DOCUMENTS

| | | | |
|---|---|---|---|
| 4,969,209 A | | 11/1990 | Schwob |
| 5,970,390 A | * | 10/1999 | Koga et al. .......... 455/42 |
| 6,052,603 A | | 4/2000 | Kinzalow et al. |
| 6,075,999 A | | 6/2000 | Vilmi et al. |
| 6,181,921 B1 | | 1/2001 | Konisi et al. |
| 6,539,212 B1 | * | 3/2003 | Kamalski .......... 455/186.1 |
| 6,728,375 B1 | | 4/2004 | Palett et al. |
| 6,782,239 B2 | * | 8/2004 | Johnson et al. ........ 455/42 |
| 6,925,114 B2 | | 8/2005 | Altizer et al. |
| 7,650,118 B2 | * | 1/2010 | Hsieh et al. .......... 455/63.3 |
| 7,680,459 B2 | * | 3/2010 | Faltman et al. ....... 455/63.3 |
| 7,801,497 B1 | * | 9/2010 | Lam .................. 455/120 |
| 2002/0029091 A1 | | 3/2002 | Seno et al. |
| 2003/0013425 A1 | | 1/2003 | Nee |
| 2003/0036357 A1 | | 2/2003 | McGowan |
| 2003/0040272 A1 | | 2/2003 | Lelievre et al. |
| 2003/0182058 A1 | | 9/2003 | Chen et al. |
| 2005/0215285 A1 | | 9/2005 | Lin |
| 2006/0099962 A1 | | 5/2006 | Lee |
| 2007/0010222 A1 | | 1/2007 | van Hoff et al. |
| 2007/0030841 A1 | | 2/2007 | Lee et al. |
| 2007/0117580 A1 | | 5/2007 | Fehr |
| 2007/0211692 A1 | | 9/2007 | Boroski et al. |

(Continued)

FOREIGN PATENT DOCUMENTS

EP        2019493        1/2009

(Continued)

OTHER PUBLICATIONS

MSN Direct Products; http://www.msndirect.com/MSNDirectProducts.aspx; 2 pages.

(Continued)

Primary Examiner — Sonny Trinh
(74) Attorney, Agent, or Firm — Bryan Cave, LLP

(57) ABSTRACT

In some embodiments, a method of transmitting electrical signals over at least one unused first frequency includes: (a) using a first electrical device to receive information identifying the at least one unused first frequency; (b) selecting a first transmission frequency from the at least one unused first frequency; (c) communicating the first transmission frequency to a user; and (d) using the transmitter of the first electrical device to broadcast the electrical signals over the first transmission frequency. Other embodiments are disclosed in this application.

43 Claims, 6 Drawing Sheets

U.S. PATENT DOCUMENTS

| | | |
|---|---|---|
| 2007/0211830 A1 | 9/2007 | Elenes et al. |
| 2009/0163225 A1 | 6/2009 | Haghighi et al. |
| 2009/0311984 A1 | 12/2009 | Khushu et al. |

FOREIGN PATENT DOCUMENTS

| | | |
|---|---|---|
| WO | WO9844663 | 10/1998 |
| WO | 0052984 | 8/2000 |
| WO | WO 2004 008649 | 1/2004 |
| WO | 2006134351 | 12/2006 |
| WO | 2007076183 | 7/2007 |
| WO | 2008062249 | 5/2008 |

OTHER PUBLICATIONS

Navigation Systems; http://www.msndirect.com/NavigationDevicesGeneric.aspx; 3 pages.

Weather Station Appliances; http://www.msndirect.com/WeatherStationDevices.aspx; 2 pages.

Smart Watch Service Plans; http://www.msndirect.com/SmartWatchServicePlans.aspx; 2 pages.

MSN Direct—Wikipedia, the free encyclopedia; en.wikipedia.org/wiler/radio_data_system; 1 page.

Radio Data System—Wikipedia, the free encyclopedia; en.wikipedia.org/wiki/MSN_Direct; 5 pages.

Subcarrier—Wikipedia, the free encyclopedia; en_wikipedia.org/wiki/subcarrier; 3 pages.

Nine Vie to Manage White Space Database, http://www.televisionbraodcast.com/PrintableView.aspx?contentid=106970, 2 pages. Jan. 24, 2011.

FCC takes "free love" approach to white spaces spectrum, http://www.networkworld.com/cgi-bin/mailto/x.cgi?pagetosend=/news/2010092710-fcc-..., 2 pages. Jan. 24, 2011.

* cited by examiner

700

750: Provide an electrical device including:
(a) a first receiver configured to receive information regarding at least one unused carrier frequency over a first medium; and
(b) a transmitter electrically coupled to the first receiver and configured to transmit data over two or more carrier frequencies

751: Sell the electrical device

752: Select at least one unused carrier frequency

753: Facilitate transmission of information identifying at least one first unused carrier frequency in a first predetermined geographic area

FIG. 7

METHOD AND SYSTEM FOR SELECTING, TRANSMITTING, AND RECEIVING AN UNUSED CARRIER FREQUENCY AND TRANSMITTING OVER THE UNUSED CARRIER FREQUENCY

FIELD OF THE INVENTION

This invention relates generally to methods and systems for broadcasting an electrical signal, and relates more particularly to methods and systems for selecting, transmitting, and receiving an unused carrier frequency and broadcasting electrical signals over the unused carrier frequency,

DESCRIPTION OF THE BACKGROUND

With the increasing popularity of portable media players, people want to listen to music or other media stored in a portable media player while driving in a vehicle. Moreover, they also want to listen to the music or other media through the vehicle's radio and speaker system. A vehicle's radio and speaker system, however, does not easily connect to a portable media player. In vehicles with a cassette player, a person can hard wire the portable media player to the cassette player in the vehicle using a bulky input connector.

Unfortunately, in a vehicle that does not have a cassette player, people have to find other ways of sending the music or other media from the portable media player to the vehicle's radio or speaker system. One method involves coupling the portable media player to a wireless transmitter, which transmits the music or other media to the vehicle's radio and speaker system over a RF (radio frequency) carrier frequency.

While using a transmitter solves the problem of coupling the portable media player to the vehicle's radio and speaker system, it creates new problems and hazards for the driver of the vehicle. For example, a driver must find an unused RF carrier frequency to transmit the electrical signals for the music or other media, and finding the unused frequency can be difficult and distracting to the driver. As another example, the unused RF carrier frequencies are constantly changing as the vehicle moves in and out of range of radio stations. Furthermore, tall buildings, hills, and other large structures can temporarily block signals on an RF carrier frequency and make a used carrier frequency seem unused. These factors can make finding an unused RF carrier frequency frustrating and potentially dangerous if a driver becomes inattentive to the road while trying to find an unused RF carrier frequency.

Accordingly, a need exists for an apparatus or system that allows a person to easily find unused frequencies on which electrical information can be wirelessly transmitted.

BRIEF DESCRIPTION OF THE DRAWINGS

To facilitate further description of the embodiments, the following drawings are provided in which:

FIG. 7 illustrates a flow chart of an example of a method of facilitating use of an electrical device, according to the first embodiment.

Figure 1:
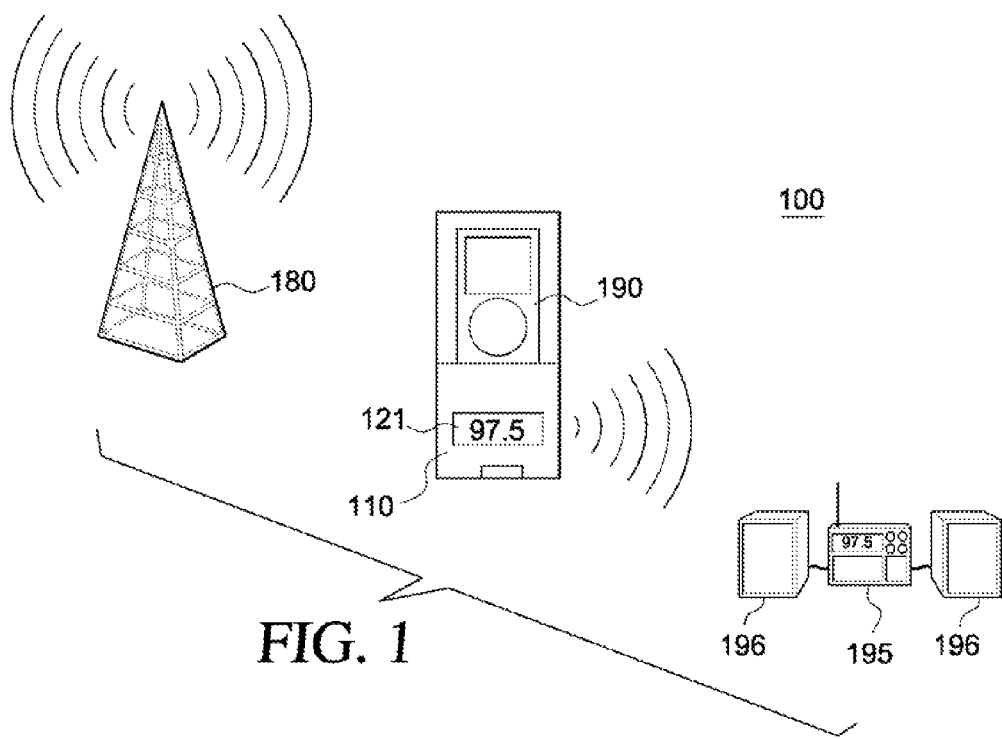
FIG. 1 illustrates an overview of a system for transmitting electrical signals over an unused frequency in a set of frequencies, according to a first embodiment.

For simplicity and clarity of illustration, the drawing figures illustrate the general manner of construction, and descriptions and details of well-known features and techniques may he omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled, two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION OF EXAMPLES OF EMBODIMENTS

In a number of embodiments, a method of transmitting electrical signals over at least one unused first frequency includes: (a) using a receiver of a first electrical device to receive information identifying the at least one unused first frequency; (b) selecting a first transmission frequency from the at least one unused first radio frequency; (c) communicating the first transmission frequency to a user; and (d) using a transmitter of the first electrical device to broadcast the electrical signals over the first transmission frequency.

In other embodiments, a method of facilitating use of a first electrical device includes: (a) providing the first electrical device to includes: (1) a first receiver configured to receive information regarding at least one first unused frequency; and (2) a transmitter electrically coupled to the first receiver and configured to transmit data over two or more frequencies; (b) selling the first electrical device; (c) facilitating transmission of information identifying at least one second unused frequency in a first predetermined geographic area. In these embodiments, the two or more frequencies include the at least one first unused frequency. Furthermore, the at least one first unused frequency includes the at least one second unused frequency.

In yet further embodiments, an electrical device includes: (a) a receiver configured to receive information regarding at least one unused frequency; (b) a transmitter electrically configured to transmit data over a first transmission frequency, and (c) a selection module electrically coupled to the receiver and the transmitter. In these embodiments, the selection module is configured to select the first transmission frequency from the at least one unused frequency and automatically tune the transmitter to the first transmission frequency.

Turning to the drawings, FIG. 1 illustrates an overview of a system 100 for transmitting electrical signals over an unused radio frequency in a set of carrier frequencies, according to a first embodiment. In this embodiment, a transmission system 180 wirelessly transmits information identifying one or more unused radio frequencies ("identifying information") in a predetermined geographic area over a first broadcast medium. An electrical device 110 receives the identifying information from transmission system 180 and selects a transmission frequency from the unused radio frequencies. Electrical device 110 then wirelessly broadcasts electrical signals received from a source 190 over the transmission frequency while also communicating the transmission frequency to a user (e.g., displaying the transmission frequency on a display 121). The user can then tune a receiving device 195 to the transmission frequency to receive the electrical signals. In some examples, the electrical signals can be audio signals and receiving device 195 can play the audio using speakers 196.

System 100 provides an automated system for the user of electrical device 110 to select an unused frequency for transmitting electrical signals. In other methods of selecting a transmission frequency, nearby geographic features (e.g., hills or a tall building) can hamper identifying unused frequencies. However, system 100 can automatically identify unused frequencies without the frustration or annoyance of false unused frequencies.

System 100 can be considered a system configured to select a transmission frequency from a set of frequencies. System 100 can also be considered a system configured to identifying at least one unused frequency in a set of frequencies. That is, system 100 can be a system for selecting a transmission frequency used to transmit an electrical signal from source 190 to receiving device 195. System 100 is merely exemplary and is not limited to the specific embodiments or examples presented herein. System 100 can be employed in many different embodiments or examples not specifically depicted or described herein.

In some embodiments, source 190 is an electrical device configured to produce electrical signals. For example, source 190 can be a mobile (or cellular) phone, a laptop computer, an audio playback device, a portable AM (amplified modulated), FM (frequency modulated), and/or satellite radio, a portable CD (compact disk) player, a data storage device, an audio player, an audio-visual media player, and/or a portable MP3 (MPEG Audio Layer-3) player (e.g., an iPod® device). In other embodiments, source 190 can be part of or integrally formed with electrical device 110. For example, electrical device 110 could include an MP3 player. Moreover, the electrical signals can be audio signals and/or video signals.

Receiving device 195 can be any electrical device that includes a receiver capable of receiving radio frequency (or other high frequency) signals. In some embodiments, receiving device 195 can be a radio or more specifically, a car radio.

In some examples, the set of carrier frequencies can include the full FM band. In the United States, the FM band includes the frequencies or channels between 87.5 MHz (megahertz) and 108 MHz. In Japan, the FM band includes frequencies between 76 MHz and 90 MHz. In Europe, the FM band includes frequencies between 87.6 MHz and 107.9 MHz.

In the US, there is a 200 KHz (kilohertz) spacing between adjacent FM bands or adjacent carrier frequencies. That is, the set of carrier frequencies include the FM bands separated by a 0.2 MHz spacing (i.e., 87.5 MHz, 87.7 MHz, 87.9 MHz, etc.). In Japan and Europe, the spacing between adjacent FM bands or adjacent carrier frequencies is 0.1 MHz. In other embodiments, the set of carrier frequencies includes a subset of the full FM band. In further embodiments, the set of carrier frequencies include other carrier frequency sets or bands (e.g., the AM, the VHF (very high frequency), or the UHF (ultra high frequency) band).

Figure 2:
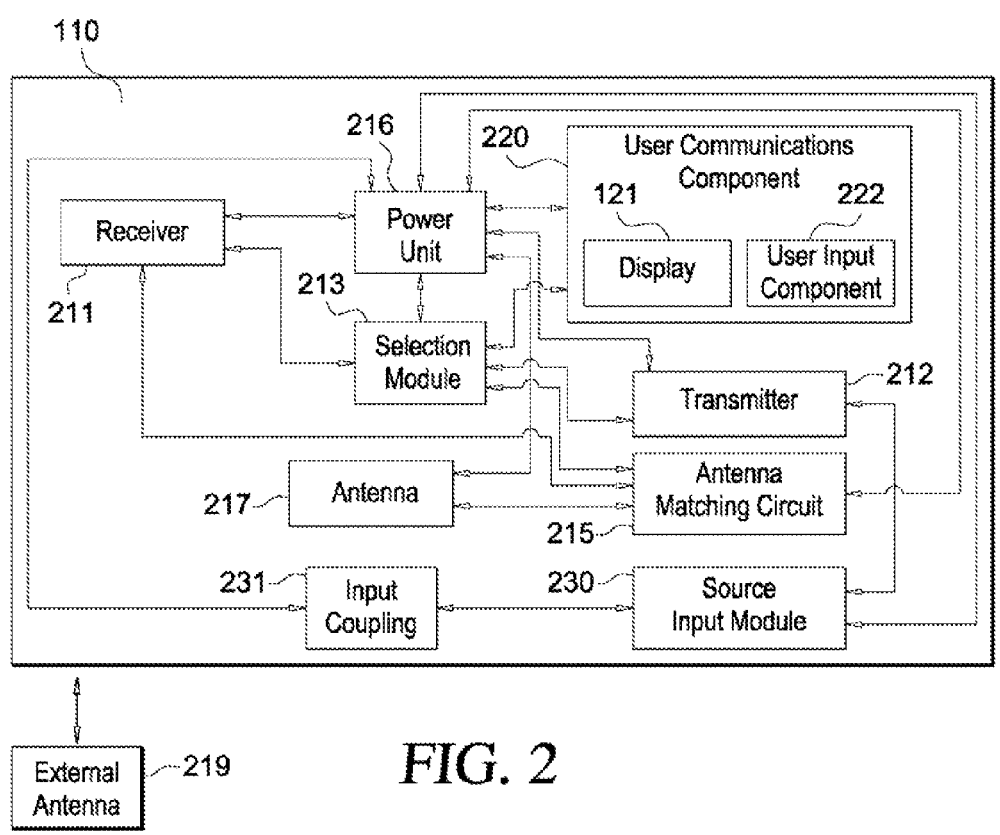
FIG. 2 is a block diagram illustrating an example of an electrical device in the system of FIG. 1. according to the first embodiment.

FIG. 2 is a block diagram illustrating an example of electrical device 110, according to the first embodiment. Electrical device 110 is merely exemplary and is not limited to the specific embodiments or examples presented herein. Electrical device 110 can be employed in many different embodiments or examples not specifically depicted or described herein.

As an example, electrical device 110 can include: (a) at least one receiver 211; (b) at least one transmitter 212; (c) a selection module 213 electrically coupled to receiver 211 and transmitter 212; (d) a user communications component 220; (e) a power unit 216; (f) at least one antenna 217; and (g) source input module 230. Selection module 213 can be configured to select the transmission frequency from at least one unused frequency. The information about the at least one unused frequency is transmitted to the electrical device by transmission system 180 (FIG. 1). Selection module 213 can also automatically tune transmitter 212 to the transmission frequency. Source input module 230 can include or be coupled to an input coupling 231. Input coupling 231 can be configured to couple to source 190 (FIG. 1).

Transmitter 212 can be configured to transmit data over the at least one unused frequency (i.e., the transmission frequency) using antenna 217. In some examples, receiver 211 can be configured to receive identifying information about the at least one unused carrier frequency over a first broadcast medium using antenna 217. Transmitter 212 and receiver 211 can be coupled to antenna 217 through antenna matching circuit 215.

To comply with FCC (Federal Communications Commission) requirements, the output of transmitter 212 (an electrical signal) is coupled to an attenuation circuit (not shown). The amount of attenuation that is needed to comply with FCC requirements is dictated by the output of the particular transmitter, the quality and type of antenna that is being utilized, and the environment in which the transmitter is being used. Consequently, the specific design of the attenuation circuit is a matter of design choice depending upon the needs of the particular application. For some types of electrical signals to be broadcast by transmitter 212, an attenuation circuit will not be needed. In some embodiments, the attenuation circuit can be a portion of antenna matching circuit 215.

In some embodiments, electrical device 110 can be coupled to an external antenna 219 through an external antenna matching circuit 215 in addition to or instead of antenna 217. Electrical device 110 can send and/or receive electrical signals using external antenna 219.

In the same or different examples, user communications component 220 can include display 121 (e.g., indicator lights or a liquid crystal display (LCD)) and an input component 222. Display 121 can be coupled to selection module 213 and configured to visually display the transmission frequency before and when transmitter 212 is transmitting electrical signals over the transmission frequency.

Input component 222 can be configured to allow a user to select a new unused frequency. Input component 222 should be broadly understood to refer to any type of mechanism (with or without moving parts) with which the user can input to electrical device 110 his or her data (for example, selection of a new carrier frequency). For example, input component 222 can be a mechanical pushbutton, an electrostatic pushbutton, an electrostatic array, a voice activated device, or any other input device of any type.

Selection module 213 can be configured to select the transmission frequency from at least one unused carrier frequency and automatically tune transmitter 212 to the transmission frequency. That is, when a user selects the new transmission frequency using input component 222, selection module 213 is configured to select a transmission frequency from the at least one unused frequencies and automatically tune transmitter 212 to this new transmission frequency. In some embodiments, selection module 213 and source input module 230 can implemented in one or more of a microprocessor, a microcontroller, or other electronic circuitry. In various examples, selection module can include or be coupled to memory (e.g., Flash or RAM (random access memory)). In some examples, the memory can store the list of the unused frequencies.

Figure 3:
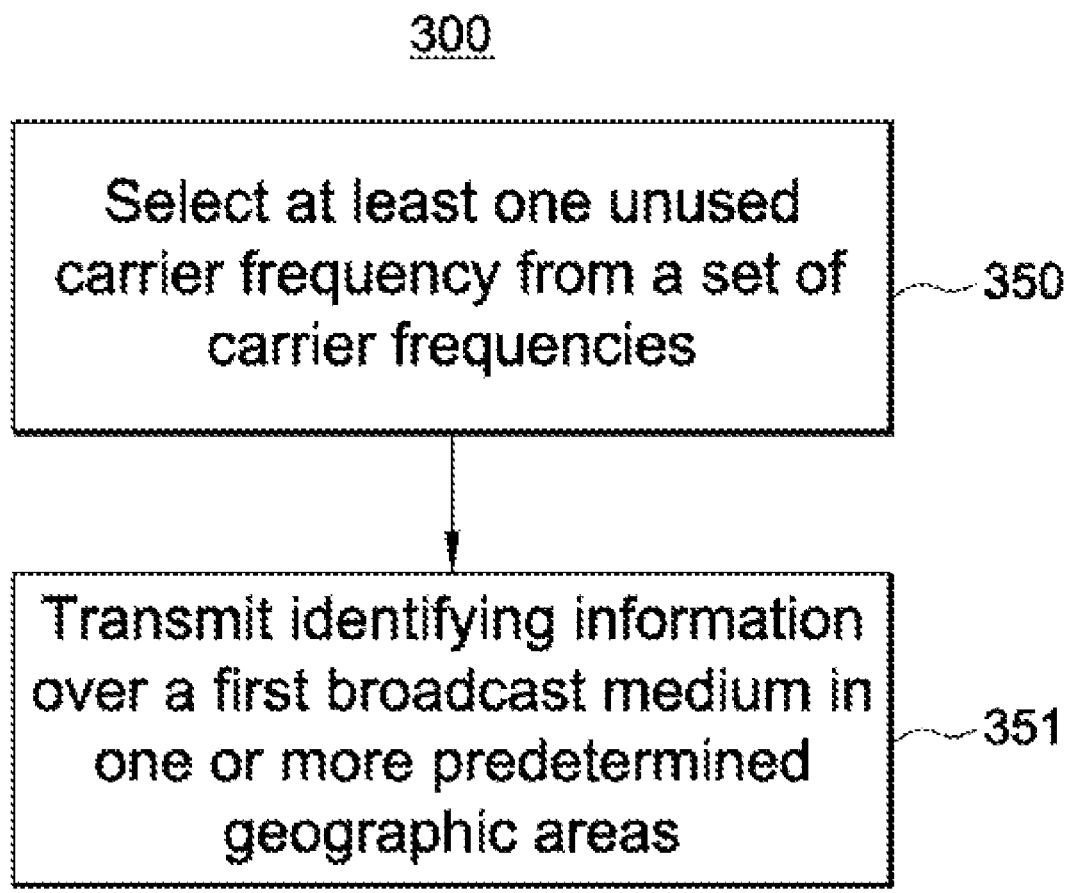
FIG. 3 illustrates a Slow chart of an example of a method of broadcasting information identifying at least one first unused frequency over a first broadcast medium, according to the first embodiment.

FIG. 3 illustrates a flow chart of an example of a method 300 of broadcasting identifying information about at least one unused carrier frequency, according to the first embodiment. Method 300 can also be considered a method for selecting two or more transmission frequencies. Method 300 is merely illustrative of a technique for implementing the various aspects of certain embodiments described herein, and system 100 (FIG. 1), and method 300 is not limited to the particular embodiments described herein, as numerous other embodiments are possible.

Figure 4:
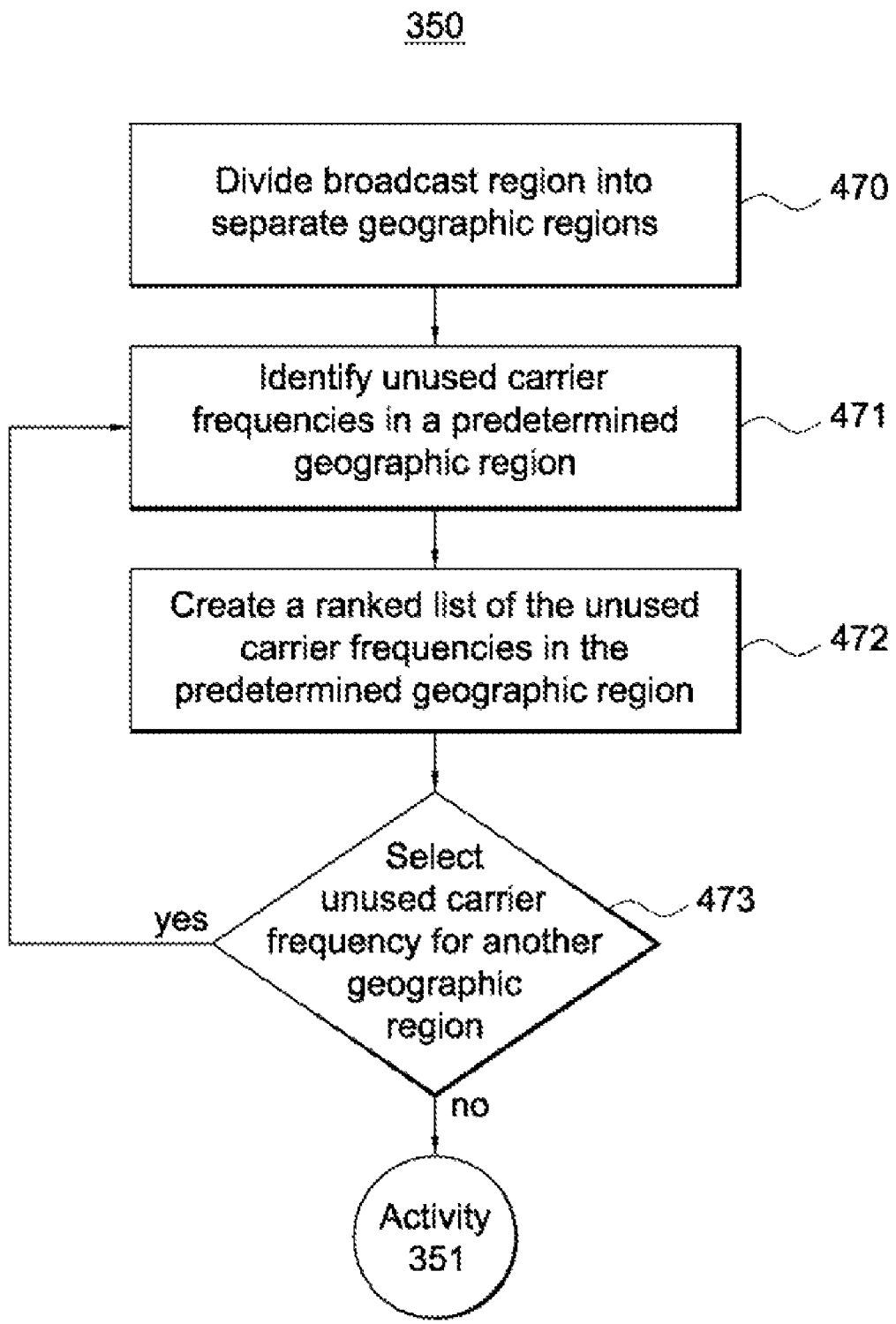
FIG. 4 is a flow chart illustrating an example of an activity of selecting at least one first unused frequency from a set of frequencies, according to the first embodiment.

In this illustrated example, a first activity in method 300 is an activity 350 of selecting at least one unused carrier frequency from a set of carrier frequencies. Activity 350 can be performed automatically in some embodiments. FIG. 4 is a flow chart illustrating an example of activity 350 of selecting at least one unused carrier frequency from a set of carrier frequencies, according to the first embodiment.

Referring to FIG. 4, the first procedure in activity 350 is a procedure 470 of dividing a broadcast region into separate geographic regions. The broadcast region is the geographic area where electrical device 110 (FIGS. 1 and 2) can receive the identifying information. For example, the geographic region could be the whole United States and Canada. In another example, the geographic area could be Japan, Mexico, Australia, Korea, Europe, a single state, county, providence, or city. In some embodiments, the broadcast region needs to be divided because different geographic, regions in the broadcast region could have different unused stations. For example, the carrier frequency 97.5 MHz could be an unused frequency in a first geographic region (e.g. the Los Angeles metropolitan region), but a radio station could be transmitting on this frequency in a second or adjacent geographic region (e.g. the San Diego and/or San Francisco metropolitan region).

In one example, the broadcast region can be divided geographic regions corresponding to radio station markets. A radio station market is a region where the population receives the same or similar radio stations. In most cases, radio station markets correspond to metropolitan regions, though rural regions with multiple population centers can also be considered a single radio station market. In one embodiment, where the broadcast region is the United States, the broadcast region could be divided into 302 geographic regions corresponding to the 302 radio station markets, as defined by Arbitron, Inc., a radio audience rating company.

In other embodiments, other methods can be used to divide the broadcast region into geographic regions. For example, the broadcast region could be divided based on the coverage regions of a first broadcast medium. For example, if the medium being used to broadcast the identifying information broadcasts a first electrical signal in a first geographic region and broadcasts a second electrical signal in a second geographic region, the broadcast region can be divided accordingly. In yet another example, the broadcast region could be divided into equally-sized geographic regions.

In some cases where the broadcast region is small or completely contained in one radio station market, procedure 470 can be skipped. For example, if the broadcast region was a single city, procedure 470 could be skipped because a single set of radio stations cover the whole broadcast region.

After the broadcast region has been divided into separate broadcast regions, the next procedure in activity 350 is a procedure 471 of identifying clear or unused frequencies in a predetermined geographic region.

In one example, a list of stations in the predetermined geographic region and their operating frequencies could be obtained from, for example, the government agency that licenses radio stations. The unused carrier frequencies could be inferred from the list of licensed radio stations. In another example, the set of carrier frequencies at one or more locations in the predetermined geographic region could be scanned, and the signal strength on each of the carrier frequencies obtained.

Referring again to FIG. 4, the next procedure in activity 350 is a procedure 472 of creating a ranked list of the unused frequencies in the predetermined geographic region. Ranking the unused carrier frequencies helps ensure that the clearest frequencies (i.e., the frequencies with the least potential interference) are provided to electrical device 110 (FIGS. 1 and 2). In some examples, the list is ordered with the clearest carrier frequencies first.

Accordingly, the unused frequencies can be ranked using a variety of criteria to compile an unused frequencies list. In one example, the unused frequencies can be ranked using a point system with carrier frequencies losing points if adjacent carrier frequencies carry stations and if adjacent or nearby geographic areas have radio stations on the potential transmission frequency.

A carrier frequency could be unused in a predetermined geographic region, but a radio station could be broadcasting a strong radio signal on the immediately adjacent frequencies. These strong signals could potentially bleed over to the adjacent unused frequency and create interference. Likewise, a strong signal (e.g., an AM clear channel signal) could transmit on that unused frequency In an adjacent or nearby geographic area and that strong signal could create interference.

In another embodiment, the RSSI (received signal strength indication) value, the SNR (signal-to-noise) ratio, and the impulse detection value for each of the unused carrier frequencies and adjacent carrier frequencies can be measured at one or more locations in the predetermined geographic region. The unused frequencies can be ranked using these factors (instead of or in addition to the factors already discussed) to create the ranked list of the unused carrier frequencies in the predetermined geographic area. In yet further embodiments, procedure 472 can be skipped and the unused frequencies are not ranked.

Referring again to FIG. 4, the next procedure in activity 350 is a procedure 473 of deciding whether to select unused frequencies for another predetermined geographic region. If unused frequencies need to be selected from other predetermined geographic regions, the next procedure in activity 350 is procedure 471. If a ranked list of the unused frequencies have been created for all or a predetermined portion of the broadcast region, then activity 350 is complete, and the next activity in method 300 is an activity 351 (FIG. 3).

Referring again to FIG. 3, the next activity in method 300 is activity 351 of transmitting identifying information over a first broadcast medium in one or more predetermined geographic areas. In some embodiments, the identifying information includes the ranked list of the unused radio frequencies created in procedure 472 (FIG. 4).

In each of the one or more predetermined geographic areas, the identifying information in that predetermined geographic area can be transmitted over the first broadcast medium. In some examples, identifying information specific to the geographic area is transmitted in every one of the one or more predetermined geographic areas. In other examples, the identifying information is only transmitted in a subset of the one or more predetermined geographic areas.

In some embodiments, the identifying information can also be encrypted before transmission. Receiver 211 (FIG. 2) or selection module 213 (FIG. 2) can decrypt the identifying information. The encryption can provide security for a subscription service and can also improve or protect the integrity of the transmission.

In various embodiments, the identifying information can include one or more of the highest ranked unused carrier frequencies in that predetermined geographic area. That is, the call numbers of one or more of the highest ranked unused carrier frequencies in the predetermined geographic area are transmitted using the first broadcast medium in the predetermined, geographic area.

In some embodiments, the identifying information is transmitted over a carrier frequency. That is, the first broadcast medium is a carrier frequency. In many examples, the information is transmitted using a subcarrier frequency of a specific carrier frequency. A subcarrier frequency is a separate analog or digital signal carried on the carrier frequency, which can transmit extra information beyond the information transmitted by the main carrier frequency. In one example, the 57 KHz (kilohertz) subcarrier frequency of a standard FM frequency can be used to transmit the information identifying at least one unused carrier frequency. In other embodiments, the identifying information is transmitted using a satellite radio signal.

In the same or different embodiments, the identifying information can be transmitted using the European Radio Data System standard or the United State's Radio Broadcast Data System standard (collectively, the "RDS standards"). The RDS standards are standards for sending small amounts of digital information in conventional FM radio broadcasts using a subcarrier frequency. Additionally, in some countries, the identifying information can be transmitted in the spacing between adjacent FM bands.

In some examples, the information can be transmitted over a first carrier frequency in a first predetermined geographic area and over a second carrier frequency in a second predetermined geographic area. Transmitting over different carrier frequencies in different predetermined geographic areas could be necessary because, for example, the used carrier frequencies vary by geographic area. Furthermore, the identifying information can be transmitted automatically and continuously or at predetermined intervals.

In another embodiment, the information identifying at least one first unused radio carrier frequency can be transmitted over a paging network in one or more predetermined geographic areas. In this embodiment, the identifying information for the predetermined geographic area is transmitted, continuously or at predetermined intervals, over a paging network in the predetermined geographic area. In some examples, at least a portion of the ranked list of unused carrier frequencies is transmitted as a single message. In other examples, a series of messages are transmitted with each of the messages including the identifying information for one or more of carrier frequencies on the ranked list of carrier frequencies.

In yet further embodiments, other broadcast mediums can be used. For example, the identifying information can be transmitted over a cellular network or a Wi-Fi (wireless fidelity) network.

In some examples, the identifying information can be transmitted using a first broadcast medium in a first predetermined area and transmitted using a second broadcast medium in a second predetermined area. Transmitting over different medium could be required because one of the mediums might not be available in every geographic region (e.g., a Wi-Fi network).

Figure 5:
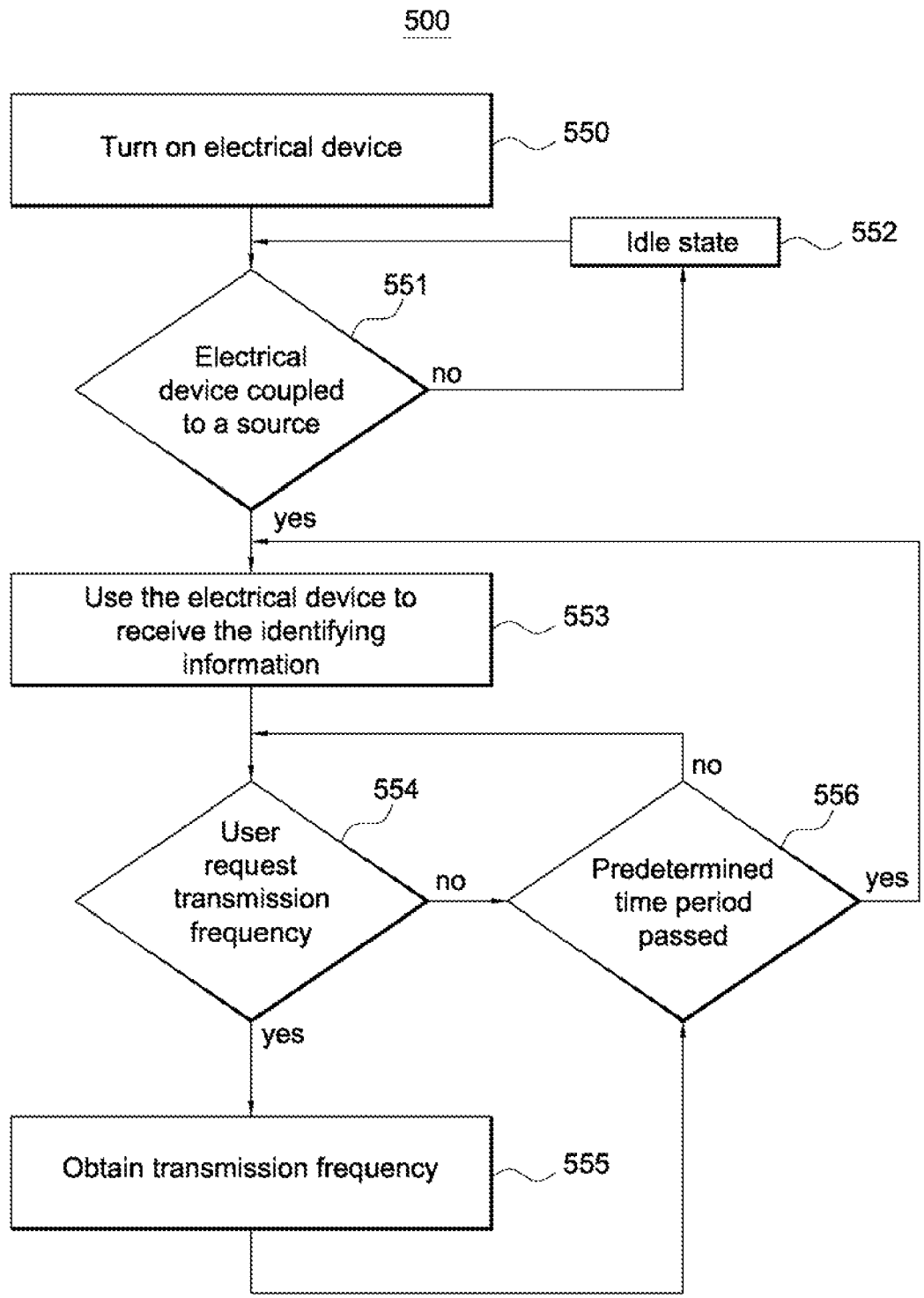
FIG. 5 illustrates a flow chart of an example of a method of transmitting electrical signals over a transmission frequency using the electrical device of FIG. 1, according to the first embodiment.

Turning to another aspect of system 100 (FIG. 1), FIG. 5 illustrates a flow chart of an example of a method 500 of transmitting electrical signals over at least one unused first frequency using electrical device 110 (FIGS. 1 and 2), according to the first embodiment. Method 500 also can be considered a method of selecting a transmission frequency from two more carrier frequencies to transmit an electrical signal. Method 500 also could be considered a method of transmitting information from source 190 (FIG. 1) to receiving device 195 (FIG. 2). Method 500 is merely illustrative of a technique for implementing the various aspects of certain embodiments described herein, and system 100 (FIG. 1), electrical device 110 (FIGS. 1 and 2), and method 500 are not limited to the particular embodiments described herein, as numerous other embodiments are possible.

In this illustrated example, a first activity in method 500 is an activity 550 of turning on electrical device 110 (FIGS. 1 and 2). In some embodiments, a user can manually turn on electrical device 110 (FIGS. 1 and 2) by using user input component 222 (FIG. 2).

After electrical device 110 (FIGS. 1 and 2) is turned on, the next activity is an activity 551 determining whether electrical device 110 (FIGS. 1 and 2) is coupled to source 190 (FIG. 1). Referring again to FIG. 2, in one example, source input module 230 can attempt to communicate with source 190 (FIG. 1) through input coupling 231.

Referring back to FIG. 5, if electrical device 110 (FIGS. 1 and 2) is not coupled to source 190 (FIG. 1), the next activity in method 500 is an activity 552 of electrical device 110 going into an idle state. Electrical device 110 (FIGS. 1 and 2) stays in the idle state until electrical device 110 detects a coupling to source 190 (FIG. 1). In one example, source input module 230 (FIG. 2) can repeat activity 551 at predetermined time intervals until source input module 230 (FIG. 2) detects a coupling of source 190 to electrical device 110 (FIGS. 1 and 2).

Referring again to FIG. 5, if electrical device 110 (FIGS. 1 and 2) is coupled to source 190 (FIG. 1), the next activity in method 500 is an activity 553 of using electrical device 110 (FIGS. 1 and 2) to receive the identifying information over a first broadcast medium. Electrical device 110 can perform activity 553 automatically in some embodiments. Referring again to FIG. 2, in some examples, receiver 211 receives the identifying information and transfers the identifying information to selection module 213.

Receiver 211 is configured to receive information transmitted over the first broadcast medium. Accordingly, when the first broadcast medium is a specific subcarrier frequency of a specific carrier frequency, receiver 211 is configured to receive information on the specific subcarrier frequencies of the specific carrier frequency In the same or different embodiment, receiver 211 can be configured to receive information transmitted in accordance with the RDS standards.

In some examples, receiver 211 can be configured to receive or attempt to receive the identifying information over several different carrier frequencies. Different carrier frequencies can be used to transmit the identifying information in different predetermined geographic areas so receiver 211 can listen for the identifying information on several predetermined carrier frequencies in various examples. In some embodiments, electrical device 110 is programmed with a set of carrier frequencies for receiver 211 to monitor for the transmission of identifying in formation.

In other embodiments, receiver 211 can be configured to receive information over other broadcast mediums. For example, receiver 211 can be configured to receive identifying information over a paging network. In other examples, receiver 211 can be configured to received information transmitted over a cellular or Wi-Fi network.

In some examples, receiver 211 can be configured to receive the information over two or more broadcast mediums. For example, receiver 211 can be configured to receive identifying information transmitted over a Wi-Fi network and a radio carrier frequency. In one embodiment, receiver 211 could try to detect a Wi-Fi network. If a Wi-Fi network is detected, receiver 211 could download the identifying information from the Internet. If a Wi-Fi network was not detected, receiver 211 could attempt to receive the identifying information from a radio carrier frequency.

Referring again to FIG. 5, the next activity in method 500 is an activity 554 of determining if the user has requested a transmission frequency. In one example, a user can use input component 222 (FIG. 2) to request a transmission frequency. In one example, if the user requests a transmission frequency through input component 222 (e.g., by pressing a button), user communications component 220 (FIG. 2) can communicate the request to selection module 213 (FIG. 2).

Figure 6:
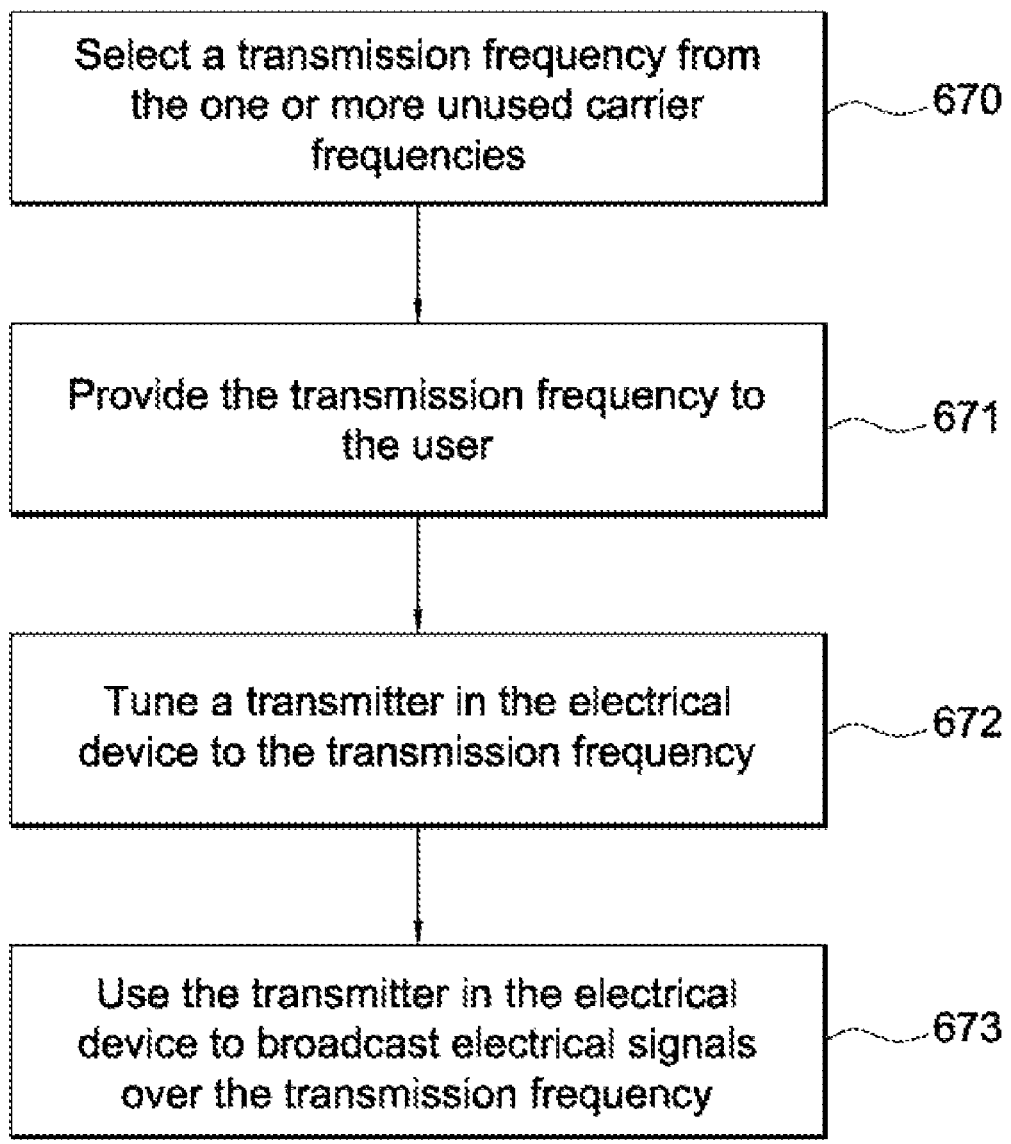
FIG. 6 illustrates a flow chart of an example of an activity of obtaining a transmission frequency, according to the first embodiment.

If the user requests a transmission frequency, the next activity in method 500 is an activity 555 of obtaining a transmission frequency. FIG. 6 illustrates a flow chart of an example of activity 555 of obtaining a transmission frequency, according to the first embodiment.

Referring to FIG. 6, the first procedure in activity 555 is a procedure 670 of selecting a transmission frequency from the one or more unused radio frequencies. Procedure 670 can be performed automatically. In some examples, selection module 213 (FIG. 2) can select the transmission frequency from the ranked list of unused carrier frequencies received by receiver 211. If the request for a transmission frequency is the first time the request is made, the highest ranked carrier frequency on the ranked listed of carrier frequencies is selected (e.g., the first frequency on the ranked listed of carrier frequencies).

In some embodiments, selection module 213 (FIG. 2) can keep a list of carrier frequencies used within a predetermined time period (e.g., fifteen minutes). Keeping a list of used frequencies can prevent selection module 233 from repeatedly providing the same carrier frequency to the user.

In some examples, selection module 213 (FIG. 2) marks the carrier frequencies as used when provided to the user. In some embodiments, if a carrier frequency is marked as used, this carrier frequency will not be provided to the user again within a predetermined time period. In a different embodiment, a carrier frequency will not be provided to the user again unless activity 553 (FIG. 5) is repeated as explained hereafter.

If the request is not the first time the request for a transmission frequency is made, selection module 213 (FIG. 2) can select the highest ranked unused carrier frequency not previously selected in the predetermined time period. If all of the unused carrier frequencies have been selected one or more times in the predetermined time period, selection module 213 (FIG. 2) can provide the one or more unused carrier frequencies to the user again in some examples.

After selecting the transmission frequency, the next procedure in activity 555 is a procedure 671 of providing the transmission frequency to the user. Procedure 671 can be performed automatically. In some examples, the transmission frequency is visually displayed to the user on display 121 (FIGS. 1 and 2). In the same or different examples, selection module 213 (FIG. 2) can instruct user communications component 220 (FIG. 2) to display the transmission frequency to the user. In other embodiments, user communications component 220 can provide the transmission frequency in an audible form. In other examples, other methods can be used to provide the transmission frequency to the user.

The next procedure in activity 555 is a procedure 672 of tuning a transmitter in the electrical device to the transmission frequency. In various examples, selection module 213 (FIG. 2) tunes transmitter 212 (FIG. 2) to the transmission frequency. The tuning can be performed automatically after procedures 670 and/or 671.

The subsequent procedure in activity 555 is a procedure 673 of broadcasting electrical signals over the transmission frequency using the transmitter in the electrical device. In many examples, transmitter 212 (FIG. 2) can broadcast electrical signals (e.g., audio, video, or data signals) received from source 190 (FIG. 1).

In some embodiments, transmitter 212 (FIG. 2) automatically begins to transmit on the transmission frequency after being instructed to transmit the electrical signals. In other examples, transmitter 212 (FIG. 2) waits a predetermined time (e.g., seven seconds) and then begins transmitting. In alternative embodiments, transmitter 212 (FIG. 2) waits for instructions from the user to begin transmitting. In some exam pie, selection module 213 (FIG. 2) instructs transmitter 212 (FIG. 2) to begin transmitting on the transmission frequency. In alternative embodiments, procedure 672 or procedures 672 and 673 can occur before or concurrent with procedure 671. Other sequences of procedures are also possible.

After procedure 673, activity 555 is complete, and the next activity in method 500 (FIG. 5) is an activity 556 (FIG. 5) of determining if a predetermined time period (e.g., thirty seconds) has passed. Also, referring again to FIG. 5, if the user has not requested a transmission frequency in activity 554, the next activity in method 500 is activity 556.

If the predetermined time has passed, the next activity in method 500 is activity 553 of receiving the identifying information in electrical device 110 (FIGS. 1 and 2). To ensure a clear transmission frequency, it preferable to repeat activity 553 at regular intervals. If electrical device 110 (FIGS. 1 and 2) is moving (e.g., in a vehicle), the carrier frequencies available for use can change. For example, as electrical device 110 (FIGS. 1 and 2) moves from a first geographic area to a second geographic area, the unused carrier frequencies can change. Accordingly, re-receiving the identifying information after a predetermined time ensures that the clearest transmission frequency is presented to the user.

If the predetermined time has not passed, the next activity in method 500 is activity 554 of determining whether a user has requested a different transmission frequency.

FIG. 7 illustrates a flow chart of an example of a method 700 of facilitating use of an electrical device, according to the first embodiment. Method 700 is merely illustrative of a technique for implementing the various aspects of certain embodiments described herein, and system 100 (FIG. 1) and method 700 are not limited to the particular embodiments described herein, as numerous other embodiments are possible.

In this illustrated example, a first activity in method 700 is an activity 750 of providing the electrical device including: (a) a first receiver configured to receive information regarding at least one first unused carrier frequency over a first broadcast medium; and (b) a transmitter electrically coupled to the first receiver and configured to transmit data over two or more carrier frequencies. In some embodiments, a manufacture, distributor, or retailer can provide the electrical device.

In some examples, the electrical device in activity 750 can be identical or similar to electrical device 110 as shown in FIGS. 1 and 2. The first receiver and the transmitter can be identical or similar to receiver 211 and transmitter 212, respectively, of FIG. 2.

In some examples, activity 750 can further include providing a second receiver configured to receive information regarding the at least one third unused carrier frequency over the second broadcast medium. The second receiver can be identical or similar to receiver 211 of FIG. 2.

The next activity in method 700 is an activity 751 of selling the electrical device. In some examples, selling the electrical device can be performed by a manufacturer by selling an electrical device identical or similar to electrical device 110 (FIGS. 1 and 2) to a distributor or retailer. In other examples, selling the electrical device can be performed by a manufacturer, distributor, or retailer selling an electrical device identical or similar to electrical device 110 (FIGS. 1 and 2) to an end-user (e.g., the general public). Selling can include leasing and/or renting.

A further activity in method 700 is an activity 752 of selecting the at least one first unused frequency. In some examples, selecting the at least one first unused frequency can be identical or similar to activity 350 of FIG. 3.

In some embodiments, activity 752 can include: (a) identifying two or more unused frequencies in the first predetermined geographic area; and (b) creating a ranked list of the two or more unused frequencies based on the signal strengths in the first predetermined geographic area of each of the two or more unused carrier frequencies. In some examples, identifying two or more unused frequencies in the first predetermined geographic area can be identical or similar to procedure 471 of FIG. 4. Creating a ranked list of the two or more unused frequencies can be identical or similar to procedure 472 of FIG. 4.

The next activity in method 700 is an activity 753 of facilitating transmission of information identifying at least one first unused frequency over the first broadcast medium in a first predetermined geographic area. In some examples, transmitting the information identifying at least one first unused frequency can be similar or identical to activity 351 of FIG. 3.

Facilitating transmission of the identifying information can include arranging for a third party to transmit the information. For example, a manufacturer of electrical device 110 (FIGS. 1 and 2) could arrange for a radio station or a paging company to broadcast identifying information in a first predetermined geographic area. In another embodiment, facilitating transmission of the identifying information can include providing a broadcaster (e.g., a radio station or paging company) the identifying information for a first predetermined geographic area. In yet another example, facilitating transmission of the identifying information can include paying (or signing an agreement or contract to pay) a broadcaster to transmit the identifying information in a first predetermined geographic area. Facilitating transmission can also include facilitating receiving the identifying information by, for example, enabling a user to turn on a device such as electrical device 110.

In some embodiments, activities 752 and 753 can also take place before or concurrent with activities 750 and/or 751.

Although the invention has been described with reference to specific embodiments, it will be understood by those skilled in the art that various changes may be made without departing from the spirit or scope of the invention. For example, it will be readily apparent electrical device 110 (FIGS. 1 and 2) could provide the user with a choice of two or more transmission frequencies instead of just providing one transmission frequency to the user, in another example, selection module 213 (FIG. 2) could minimize the amount the user has to change the carrier frequency by providing the unused carrier frequencies closed to the last transmission frequency, instead of the highest ranked carrier frequency. Additional examples of such changes have been given in the foregoing description. Accordingly, the disclosure of embodiments of the invention is intended to be illustrative of the scope of the invention and is not intended to be limiting.

It is intended that the scope of the invention shall be limited only to the extent required by the appended claims. To one of ordinary skill in the art, it will be readily apparent that the case and method of use discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of transmitting electrical signals over at least one unused first frequency, the method comprising:
    using a receiver of a first electrical device to receive information identifying the at least one unused first frequency;
    selecting a first transmission frequency from the at least one unused first frequency;
    communicating the first transmission frequency to a user;
    using a transmitter of the first electrical device to broadcast the electrical signals over the first transmission frequency;
    after communicating the first transmission frequency, selecting a second transmission frequency from the at least one unused first frequency;
    communicating the second transmission frequency to the user; and
    using the transmitter of the first electrical device to broadcast the electrical signals over the second transmission frequency.

2. The method of claim 1, further comprising:
    tuning the transmitter of the first electrical device to the first transmission frequency.

3. The method of claim 1, wherein:
    communicating the first transmission frequency to the user comprises:
        using the first electrical device to visually display the first transmission frequency.

4. The method of claim 1, wherein:
    using the receiver of the first electrical device to receive the information comprises:
        using the receiver of the first electrical device to receive the information using a radio broadcast data system standard.

5. The method of claim 4, wherein:
    using the receiver to receive the information further comprises:
        using the receiver of the first electrical device to receive the information identifying the at least one unused first frequency over a subcarrier frequency of a frequency signal.

6. The method of claim 5, wherein:
    the subcarrier frequency is a 57 kilohertz signal.

7. The method of claim 1, wherein:
    selecting the first transmission frequency comprises:
        using the first electrical device to automatically select the first transmission frequency from the at least one unused first frequency.

8. The method of claim 1, wherein:
    using the receiver of the first electrical device further comprises:
        using the receiver of the first electrical device to automatically receive the information identifying the at least one unused first frequency.

9. The method of claim 1, wherein:
    using the transmitter of the first electrical device to broadcast the electrical signals over the first transmission frequency further comprises:
        using the transmitter of the first electrical device to automatically broadcast the electrical signals over the first transmission frequency.

10. A method of transmitting electrical signals over at least one unused first frequency, the method comprising:
    using a receiver of a first electrical device to receive information identifying the at least one unused first frequency;
    selecting a first transmission frequency from the at least one unused first frequency;
    communicating the first transmission frequency to a user;
    using a transmitter of the first electrical device to broadcast the electrical signals over the first transmission frequency;
    using the receiver of the first electrical device to receive information identifying at least one unused second frequency;
    selecting a second transmission frequency from the at least one unused second transmission frequency;
    communicating the second transmission frequency to the user; and
    using the transmitter in the first electrical device to broadcast the electrical signals over the second transmission frequency.

11. The method of claim 10, wherein:
    using the receiver of the first electrical device to receive the information identifying the at least one unused first frequency comprises:
        using the receiver of the first electrical device to receive the information identifying the at least one unused first frequency over a subcarrier frequency of a frequency signal.

12. The method of claim 11, wherein:
    the subcarrier frequency is a 57 kilohertz signal.

13. The method of claim 10, wherein:
    using the receiver of the first electrical device to receive the information identifying the at least one unused first frequency comprises:
        using the receiver of the first electrical device to receive the information identifying the at least one unused first frequency over a paging network.

14. The method of claim 10, wherein:
    selecting the first transmission frequency comprises:
        using the first electrical device to automatically select the first transmission frequency from the at least one unused first frequency.

15. The method of claim 10, wherein:
    using the receiver of the first electrical device to receive the information identifying the at least one unused first frequency further comprises:
        using the receiver of the first electrical device to automatically receive the information identifying the at least one unused first frequency.

16. The method of claim 10, wherein:
    using the transmitter of the first electrical device to broadcast the electrical signals over the first transmission frequency further comprises:

using the transmitter of the first electrical device to automatically broadcast the electrical signals over the first transmission frequency.

17. An electrical device comprising:
a receiver configured to receive information regarding at least one unused frequency;
a transmitter electrically configured to transmit data over a first transmission frequency;
and a selection module electrically coupled to the receiver and the transmitter, wherein:
the selection module is configured to select the first transmission frequency from the at least one unused frequency and automatically tune the transmitter to the first transmission frequency;
the selection module is further configured to select a second transmission frequency from the at least one unused frequency and automatically tune the transmitter to the second transmission frequency after selecting the first transmission frequency and after automatically tuning the transmitter to the first transmission; and
the receiver is configured to receive the information identifying the at least one unused frequency over a carrier frequency from a radio broadcast device.

18. The electrical device of claim 17, further comprising:
a display coupled to the selection module and configured to visually display the first transmission frequency.

19. The electrical device of claim 17, further comprising:
a user input component coupled to the selection module and configured to allow a user to select a new transmission frequency from the at least one unused frequency, wherein:
when the user selects the new transmission frequency using the user input component, the selection module is configured to select the new transmission frequency and automatically tune the transmitter to the new transmission frequency.

20. The electrical device of claim 17, wherein:
the receiver is configured to receive the information identifying the at least one unused frequency over a subcarrier frequency of the carrier frequency from the radio broadcast device.

21. The electrical device of claim 20, wherein:
the subcarrier frequency is a 57 kilohertz signal.

22. The electrical device of claim 17, wherein:
the receiver is configured to receive the information identifying the at least one unused frequency over a subcarrier frequency of the carrier frequency from the radio broadcast device using a radio broadcast data system standard.

23. The method of claim 17, wherein:
the selection module is further configured to automatically select the first transmission frequency from the at least one unused frequency.

24. The method of claim 17, wherein:
the receiver is configured to automatically receive the information regarding the at least one unused frequency.

25. The method of claim 17, wherein:
the transmitter is electrically configured to automatically transmit the data over the first transmission frequency.

26. A method of transmitting electrical signals over at least one unused first frequency, the method comprising:
using a receiver of a first electrical device to receive information identifying the at least one unused first frequency;
selecting a first transmission frequency from the at least one unused first frequency;
communicating the first transmission frequency to a user;
using a transmitter of the first electrical device to broadcast the electrical signals over the first transmission frequency;
after communicating the first transmission frequency, selecting a second transmission frequency from the at least one unused first frequency;
communicating the second transmission frequency to the user; and
using the transmitter of the first electrical device to broadcast the electrical signals over the second transmission frequency, wherein:
using the receiver of the first electrical device to receive the information comprises:
using the receiver of the first electrical device to receive the information identifying the at least one unused first frequency over a paging network.

27. The method of claim 26, wherein:
selecting the first transmission frequency comprises:
using the first electrical device to automatically select the first transmission frequency from the at least one unused first frequency.

28. The method of claim 26, wherein:
using the receiver of the first electrical device further comprises:
using the receiver of the first electrical device to automatically receive the information identifying the at least one unused first frequency.

29. The method of claim 26, wherein:
using the transmitter of the first electrical device to broadcast the electrical signals over the first transmission frequency further comprises:
using the transmitter of the first electrical device to automatically broadcast the electrical signals over the first transmission frequency.

30. The method of claim 26, wherein:
using the transmitter of the first electrical device to broadcast the electrical signals over the first transmission frequency further comprises:
using the transmitter of the first electrical device to broadcast a first portion of the electrical signals over the first transmission frequency; and
using the transmitter of the first electrical device to broadcast the electrical signals over the second transmission frequency further comprises:
using the transmitter of the first electrical device to broadcast a second portion of the electrical signals over the second transmission frequency, wherein the second portion of the electrical signals are different from the first portion of the electrical signals.

31. A method of transmitting electrical signals over at least one unused first frequency, the method comprising:
using a receiver of a first electrical device to receive information identifying the at least one unused first frequency;
selecting a first transmission frequency from the at least one unused first frequency;
communicating the first transmission frequency to a user;
using a transmitter of the first electrical device to broadcast the electrical signals over the first transmission frequency;
after communicating the first transmission frequency, selecting a second transmission frequency from the at least one unused first frequency;
communicating the second transmission frequency to the user; and using the transmitter of the first electrical device to broadcast the electrical signals over the second transmission frequency, wherein:
using the receiver to receive the information comprises:
using the receiver of the first electrical device to receive the information identifying the at least one unused first frequency over a subcarrier frequency of a frequency signal.

32. The method of claim 31, wherein:
the subcarrier frequency is a 57 kilohertz signal.

33. The method of claim 31, wherein:
selecting the first transmission frequency comprises:
   using the first electrical device to automatically select the first transmission frequency from the at least one unused first frequency.

34. The method of claim 31, wherein:
using the receiver of the first electrical device further comprises:
   using the receiver of the first electrical device to automatically receive the information identifying the at least one unused first frequency.

35. The method of claim 31, wherein:
using the transmitter of the first electrical device to broadcast the electrical signals over the first transmission frequency further comprises:
   using the transmitter of the first electrical device to automatically broadcast the electrical signals over the first transmission frequency.

36. The method of claim 31, wherein:
using the transmitter of the first electrical device to broadcast the electrical signals over the first transmission frequency further comprises:
   using the transmitter of the first electrical device to broadcast a first portion of the electrical signals over the first transmission frequency; and
   using the transmitter of the first electrical device to broadcast the electrical signals over the second transmission frequency further comprises:
   using the transmitter of the first electrical device to broadcast a second portion of the electrical signals over the second transmission frequency, wherein the second portion of the electrical signals are different from the first portion of the electrical signals.

37. A method of transmitting electrical signals over at least one unused first frequency, the method comprising:
   using a receiver of a first electrical device to receive information identifying the at least one unused first frequency;
   selecting a first transmission frequency from the at least one unused first frequency;
   communicating the first transmission frequency to a user;
   using a transmitter of the first electrical device to broadcast the electrical signals over the first transmission frequency;
   using the receiver of the first electrical device to receive information identifying at least one unused second frequency;
   selecting a second transmission frequency from the at least one unused second transmission frequency;
   communicating the second transmission frequency to the user; and
   using the transmitter in the first electrical device to broadcast the electrical signals over the second transmission frequency, wherein:
   using the receiver of the first electrical device to receive the information comprises:
   using the receiver of the first electrical device to receive the information identifying the at least one unused first frequency using a radio broadcast data system standard.

38. The method of claim 37, wherein:
using the receiver of the first electrical device to receive the information identifying the at least one unused first frequency comprises:
   using the receiver of the first electrical device to receive the information identifying the at least one unused first frequency over a subcarrier frequency of a frequency signal.

39. The method of claim 33, wherein:
the subcarrier frequency is a 57 kilohertz signal.

40. The method of claim 37, wherein:
selecting the first transmission frequency comprises:
   using the first electrical device to automatically select the first transmission frequency from the at least one unused first frequency.

41. The method of claim 37, wherein:
using the receiver of the first electrical device to receive the information identifying the at least one unused first frequency further comprises:
   using the receiver of the first electrical device to automatically receive the information identifying the at least one unused first frequency.

42. The method of claim 37, wherein:
using the transmitter of the first electrical device to broadcast the electrical signals over the first transmission frequency further comprises:
using the transmitter of the first electrical device to automatically broadcast the electrical signals over the first transmission frequency.

43. The method of claim 37, wherein:
using the transmitter of the first electrical device to broadcast the electrical signals over the first transmission frequency further comprises:
   using the transmitter of the first electrical device to broadcast a first portion of the electrical signals over the first transmission frequency; and
using the transmitter of the first electrical device to broadcast the electrical signals over the second transmission frequency further comprises:
   using the transmitter of the first electrical device to broadcast a second portion of the electrical signals over the second transmission frequency, wherein the second portion of the electrical signals are different from the first portion of the electrical signals.

* * * * *